May 26, 1970 E. E. SCHUMACHER 3,513,742

MEANS FOR FORMING REGISTER HOLES, IN INDIVIDUAL IMAGE REPRODUCING MEMBERS IN EXACT CONFORMITY WITH BUT INDEPENDENTLY OF A MASTER SHEET

Filed Aug. 26, 1968 2 Sheets-Sheet 1

INVENTOR.
ERNST E. SCHUMACHER

BY Rummler & Snow
Attys.

May 26, 1970 E. E. SCHUMACHER 3,513,742

MEANS FOR FORMING REGISTER HOLES, IN INDIVIDUAL IMAGE REPRODUCING MEMBERS IN EXACT CONFORMITY WITH BUT INDEPENDENTLY OF A MASTER SHEET

Filed Aug. 26, 1968 2 Sheets-Sheet 2

INVENTOR.

ERNST E. SCHUMACHER

BY Rummler & Snow

ATTYS.

United States Patent Office 3,513,742

Patented May 26, 1970

3,513,742

MEANS FOR FORMING REGISTER HOLES, IN INDIVIDUAL IMAGE REPRODUCING MEMBERS IN EXACT CONFORMITY WITH BUT INDEPENDENTLY OF A MASTER SHEET

Ernst E. Schumacher, 3113 Postfach, 6 Frankfort on the Main 1, Germany

Filed Aug. 26, 1968, Ser. No. 755,065

Claims priority, application Germany, Aug. 24, 1967, K 58,658

Int. Cl. B26f *1/02;* B26d *7/00*

U.S. Cl. 83—409 8 Claims

ABSTRACT OF THE DISCLOSURE

A device for producing register holes in an image producing member in exact conformity with preformed register holes of a master sheet including a work table having at least a pair of fixed space apart hole forming elements, a pair of removable guide pins projecting from the work table surface for positioning a pre-punched master sheet in pre-determined spaced relation with the hole forming elements, and a carrier means for engaging a member registered with the master sheet and shifting the member along a precise path to position for engagement by the hole forming elements.

BACKGROUND OF THE INVENTION

In the reproduction technique and in cartography various kinds of register pin systems are used for accurate positioning of the film in the course of process operations, such as superprinting in perfect register or contact printing. For this purpose register holes are produced by means of punching or drilling tools. In conjunction with the corresponding register pins fixed on appropriate pin bars, frames or tables, these holes make it possible to precisely position the various materials.

In most cases it is possible to punch films, foils or plates before they are processed. A set of register pins in conjunction with identical register holes in the copy, for instance a diapositive, as well as in the foil or plate onto which it has to be transferred, make it possible to bring both elements in perfect coincidence, so that the subsequent transfer either by printing down or by tracing or similar methods may be carried out with utmost precision.

It may happen, however, that copy and photographic material which have to be handled in perfect register are not yet punched. It is also often necessary, particularly in cartography, to add to a set of pre-punched positives another positive which is not yet provided with register holes.

Plates for multi-colour prints or maps very rarely have register holes which would allow their precise fastening on plate supports or cylinders. Therefore, they must also be punched before they can be properly handled.

To accomplish this task it was hitherto necessary to place the punched master sheet on the table of the hole forming punch in such a way that the register holes in the film were in exact alignment with the punching tools. Then the film to be punched had to visually be put into register with the master sheet. However, the subsequent punching operation could not be limited to just the superimposed film, but the punching tools also passed through the holes of the underlying master sheet, with the risk of damaging them. Moreover, it is easier to obtain perfectly and neatly cut holes if the film is placed directly on the matrix instead of an underlying sheet of master material.

SUMMARY OF THE INVENTION

A primary object of the invention is to provide a relatively simple device having hole forming means wherewith a film or other sheet of material can be precisely registered with the image on a prepunched master sheet, which is held in fixed predetermined relation with the hole forming means, and then moved from the master sheet to the hole forming means by a shiftable carrier and holding means which travels precisely along a predetermined path.

To accomplish this object, it is proposed to provide an apparatus having a horizontal work surface and at least two vertically acting hole forming elements spaced apart and disposed adjacent one side of the work surface, which apparatus is characterized by having at least two removable guide pins projecting from the work surface and lying in a plane spaced from that of the hole forming elements, the said guide pins having precisely the same space apart relation as the hole forming elements, means for holding a prepunched master sheet in position determined by the guide pins, and a shiftable sheet carrier means movable along a fixed predetermined path extending from the plane of the guide pins center lines to the plane of the center lines of the hole forming elements and adapted to lift a film or other sheet from registry with the master sheet and to move it into position for engagement by the hole forming elements.

The guide pins are of precisely the same size and shape, in cross section, as the hole forming elements and preferably are removed by retracting them below the work surface after the master sheet has been secured in the position established by placing it on the guide pins. This provides a clear area for placing on and registering with the master sheet the film or other member to be punched, and the registered member is then picked up and held to the shiftable carrier means by vacuum, or other suitable means, during its transfer from the registered position to the hole forming elements.

This special feature of the improved hole forming device dispenses with the afore-mentioned critical procedure of placing the master sheet on the punching die. The sheet is simply placed on the guide pins, which do not come within the operational range of the punching or drilling tools, and the material to be punched is then shifted to the correct position by means of the displaceable carrier means.

The novel design of this hole forming apparatus is based on the idea that it is an advantage to bring the pre-punched sheet, placed on guide pins on the preferably luminous table, in a position that differs from the original punching position by an exactly pre-established amount, with regard to both the direction and the distance. The punch apparatus according to the invention is furthermore provided with a device that holds the material to be punched either from below or from above, preferably by the action of vacuum. However, the material may also be held in position by means of adhesive varnishes, by electrostatic or magnetic means. The carrier means may be either incorporated in the feeding work table surface displaceable in such a way that the travel of the film to be punched is equal to the distance between the centres of the punching or drilling tools and the centres of the corresponding guide pins and that the direction of displacement is parallel to the theoretical connecting lines between the centres of the punching or drilling tools and the centres of the corresponding guide pins.

DESCRIPTION OF THE DRAWINGS

Specific embodiments of my invention are shown in the accompanying drawings in which

FIG. 3 shows the step of positioning the master sheet, FIG. 4 shows the engagement of the registered member by the carrier means, and FIG. 5 shows the transfer of the registered member to the punching or hole forming position.

DESCRIPTION OF THE PREFERRED EMBODIMENT

Figure 1:
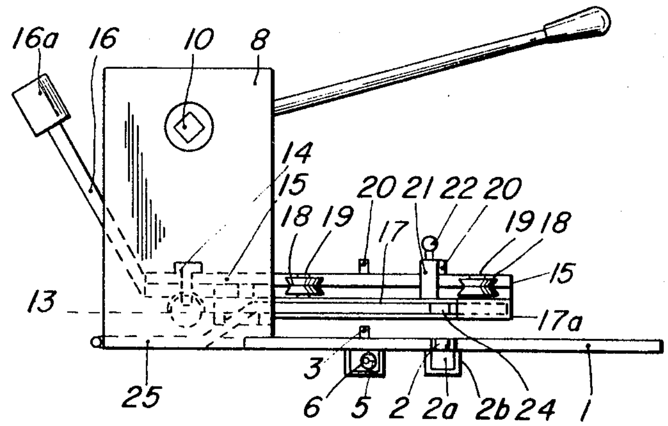
FIG. 1 is a side elevational view of one arrangement of the improved apparatus for forming register holes.
Figure 2:
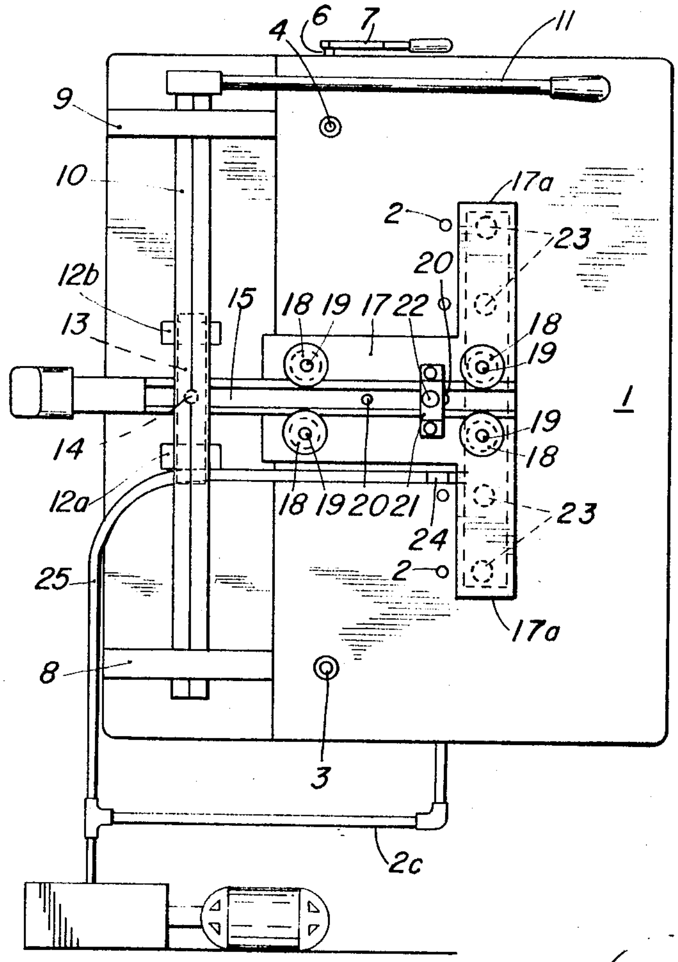
FIG. 2 is a top plan view of the same.

Referring to FIGS. 1 and 2 it will be seen that the improved punch or hole forming apparatus comprises a table or platform 1 having a horizontal work surface. This table is provided with a plurality of holes 2 opening to the work surface from a passage 2*a* in a channel 2*b* extending transversely of the table on its underside, the passage 2*a* being connected to a suitable vacuum pump by a conduit 2*c* whereby a plate, film, or other sheet form copy can be held firmly to the work surface by vacuum. As shown, this table is provided with retractable guide pins 3 and 4 which normally project above the work surface for reception of a pre-punched master sheet, the pins 3 and 4 being mounted in suitable bushings and arranged for actuation by an accentric 5 mounted on the underside of the table 1 and carried by a shaft 6 which extends from one side of the table 1 and is provided with an operating lever 7 by which the shaft 6 can be rotated to retract or project the guide pins 3 and 4.

The hole forming tools 8 and 9, shown as punches, are located at the rear side of the table 1 and are either mounted at a fixed distance from each other or are laterally displaceable. In the latter case the bushings and guide pins 3 and 4 are preferably suitably linked to the respective hole forming tools 8 and 9 are arranged to slide in suitable channels not shown in the work table so that they are moved simultaneously with the tools.

As shown, the hole forming tools 8 and 9 are punching tools and each has a die and a matrix. For simultaneous operation of these punching tools, they are connected by a rotatable square shaft 10 which extends through suitable bushings in each tool and which carries an operating lever 11 at one end.

As shown in FIGS. 1 and 2 the carrier means comprises a T-shaped body 17 having hollow laterally projecting arms 17*a* at its forward end. The body 17 is slidably mounted on a guide bar 15 by means of rollers 18, each of which has a peripheral V-shaped groove adapted to ride on the complementary V-shaped edges of the bar 15. The rollers 18 are rotatably mounted on eccentric bolts 19 by means of which the respective rollers are adjusted to the guide bar 15 so as to obviate lateral play or sway of the carrier means 17. The guide bar 15 is mounted on the upper side of a sturdy shaft 13 which, in turn, is rotatably mounted in bearing blocks 12*a* and 12*b*, suitably secured at the rear center part of the work table 1 and fixed, by means not shown, against both lateral and endwise play. The guide bar 15 is fixed to the shaft 13, either by welding or by means of a screw 14, and the carrier means 17 and guide bar 15 are counterbalanced by a rearwardly and upwardly extending portion 16 which has a countered weight 16*a* at its outer end. In this manner the carrier means is arranged for limited rocking movement about the axis of the shaft 13 whereby the arms 17*a* may be brought downwardly to contact and pick up a sheet on the work table and then lifted upwardly for transferring the sheet rearwardly to the hole forming elements.

As shown the guide bar 15 is provided with longitudinally spaced stop pins 20 projecting from its top surface for engagement by a stop loop 21 suitably mounted on the carrier means 17 for limiting its movement toward and away from the hole forming elements 8 and 9 and thereby assuring that each member registered with a master sheet position by the guide pins 3 and 4 will have complementary register holes in precisely the same location relative to the respective images. A knob 22 may be provided on the stop loop 21 for manual operation of the carrier means and the knob 22 may simultaneously serve as a locking screw for the carrier means.

As shown in FIG. 2, the carrier means is provided with a vacuum arrangement for picking up and holding a sheet member for transfer to the hole punching position. As before mentioned the carrier arms 17*a* are hollow. Openings 23 in the underside of the arms 17*a* lead to the hollow interior and this is connected to a slitable vacuum source by means of a nipple 24 and a flexible hose 25.

Figures 3, 4, 5:
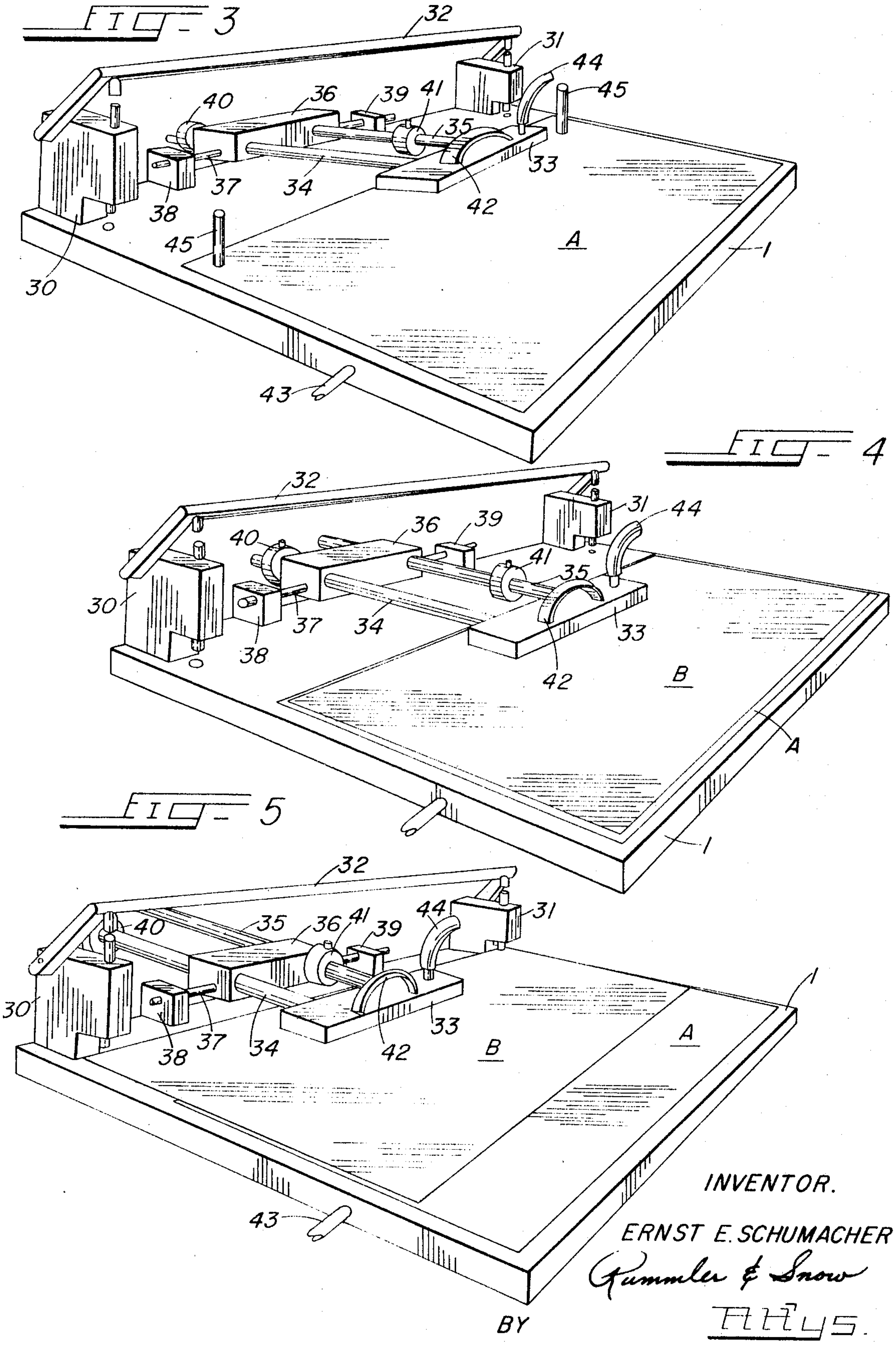
FIGS. 3, 4 and 5 are perspective views showing a modified arrangement of the hole forming apparatus and illustrating its principle of operation.

In the form of the apparatus shown in FIGS. 3, 4 and 5 the punch means 30 and 31 are fixedly mounted at the rear end of the work table 1 and are actuated simultaneously by a cross bar 32 extending between arms pivotedly mounted on the respective punch means. The carrier means 33 is fixedly mounted on a pair of parallel slide bars 34 and 35 which are slideable longitudinally, in the direction normal to the plane of the hole punching elements, through a slide block 36. As shown, the slide block 36 is mounted on a rotatable shaft 37, carried by fixed bearing blocks 38 and 39, and provided with means, not shown, to obviate any lateral or longitudinal play. Stop means 40 and 41 are mounted on the slide bars 34 and 35 to limit the shifting movement of the carrier means 33 in both directions and a handle 42 is provided on the carrier means for operating it.

As in the case of the form of my invention shown in FIGS. 1 and 2 the work table 1 is provided with vacuum means by way of conduit 43 for holding a master copy in fixed position and the carrier means has a vacuum connection 44 for picking up and transporting a registered member to the hole forming station. Also, as shown, removable guide pins 45 are provided in this form of the invention. In this case, however, the guide pins 45 are manually placed and removed. In any case, it will be understood that the work surface may be transparent or translucent and illuminated from the underside.

The operation of my invention is best described with reference to the device as illustrated by FIGS. 3, 4 and 5. If the master sheet or copy is transparent and the materials to be punched comprise transparent foils, the master sheet may be placed either on top or underneath the foil and either of two procedures may be used as follows:

(1) Pre-punch the master sheet A with the hole forming elements (8, 9 or 30, 31) and then place it on the guide pins (3, 4 or 45) as shown in FIG. 3. Turn on the work table vacuum to hold the master sheet in the position determined by the guide pins and then retract or remove the guide pins. Now place the sheet, film or foil B to be punched in register with the master sheet A, as shown in FIG. 4, and lower the carrier means (17 or 33) into contact with the sheet B. Turn on the carrier means vacuum and then shift the carrier means toward the hole forming elements to position the sheet B in punching position as shown in FIG. 5. Then operate the hole forming means to form the desired register holes, or (2) Position the prepunched master sheet on the guide pins and then turn on the carrier means vacuum, remove or retract the guide pins, lower the carrier means to pick up the master sheet, and then shift the carrier to place the master sheet in hole punching position. Now, slip the film or foil to be punched under the master sheet and put it in register therewith, secure the sheet to be punched in registered position by turning on the work table vacuum, withdraw the master sheet from the hole forming elements by operation of the carrier means, and then operate the hole forming elements to punch the desired register holes in the film or foil.

For registering and punching opaque material the second procedure is generally employed.

It will be understood that the hereindescribed device may be made with any desired number of hole forming elements and that the said elements may be constructed to form register holes of any desired shape. Also it will be understood that the work surface may be made to accommodate several lateral spacing arrangements of the removable guide pins for positioning various sizes of master sheets relative to the hole forming elements.

Although two specific embodiments of my invention have been herein shown and described it will be understood that details of the structures shown may be altered or omitted without departing from the spirit of the invention as defined by the following claims.

I claim:

1. A device for forming register holes in a sheet member in exact conformity with the pre-formed register holes and image of a master sheet having a master image; said device comprising a table having a work surface and a plurality of spaced hole forming elements mounted adjacent one end of the work surface, a pair of removable guide pins projecting from the said work surface and spaced apart the precise distance between at least a pair of the hole forming elements for positioning the master sheet member in a predetermined relation with the hole forming elements, a shiftable carrier means for engaging and holding a sheet member and transporting the same from a first position determined by registry with a master sheet positioned by the guide pins to a predetermined second position aligned with the hole forming elements, and means for confining the movement of the carrier means to a predetermined path between said first and second positions.

2. A device as defined by claim 1 wherein the guide pins are retractable into the table body, and means are provided for operating the guide pins simultaneously.

3. A device as defined by claim 1 wherein the table work surface includes means for holding a master sheet at the position determined by the guide pins when the said pins are removed.

4. A device as defined by claim 3 wherein the means for holding the master sheet comprises a plurality of openings in the work surface communicating with a vacuum source.

5. A device as defined by claim 1 wherein the carrier means is supported by a guide arm mounted on said table for limited oscillatory movement in a plane normal to the work surface.

6. A device as defined by claim 1 wherein the carrier means is slidable along a guide arm extending substantially perpendicular to the plane of the hole forming elements and mounted for oscillatory movement about an axis lying parallel with the said plane.

7. A device as defined by any one of claims 1, 3 and 5 wherein the carrier means is provided with releasable means for holding a sheet in fixed position on the carrier during transport of the sheet between the said first and second positions.

8. A device for forming register holes in an image producing member in exact conformity with the preformed register holes of a master sheet; said device having a pair of spaced hole forming elements mounted in fixed position on a table having a horizontal work surface, means for holding the master sheet in fixed position on said work surface, a pair of removable guide pins projecting from the work surface for positioning the master sheet thereon in spaced relation with the hole forming means, said pins being spaced apart the same distance as the hole forming means and lying in a plane parallel with the plane of the hole forming means, and means for engaging and holding an image producing member registered with the master sheet and shifting said member along a predetermined path into a predetermined position relative to said hole forming elements.

References Cited

UNITED STATES PATENTS

| | | | |
|---|---|---|---|
| 3,196,725 | 7/1965 | Hulen | 83—633 X |
| 3,198,047 | 8/1965 | Munz | 83—520 X |
| 3,207,021 | 9/1965 | Bradley | 83—520 |

WILLIAM S. LAWSON, Primary Examiner

U.S. Cl. X.R.

83—437, 520, 620, 633